(12) United States Patent
Kawashima et al.

(10) Patent No.: US 11,018,549 B2
(45) Date of Patent: May 25, 2021

(54) ROTATING ELECTRIC MACHINE HAVING DYNAMIC VIBRATION ABSORBER

(71) Applicant: MITSUBISHI ELECTRIC CORPORATION, Tokyo (JP)

(72) Inventors: Koji Kawashima, Tokyo (JP); Fumio Matsumoto, Tokyo (JP); Takaaki Nagashima, Tokyo (JP); Takuma Sasai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 205 days.

(21) Appl. No.: 16/063,354

(22) PCT Filed: Jan. 5, 2016

(86) PCT No.: PCT/JP2016/050062
§ 371 (c)(1),
(2) Date: Jun. 18, 2018

(87) PCT Pub. No.: WO2017/119059
PCT Pub. Date: Jul. 13, 2017

(65) Prior Publication Data
US 2018/0367002 A1 Dec. 20, 2018

(51) Int. Cl.
*H02K 5/24* (2006.01)
*H02K 1/18* (2006.01)

(52) U.S. Cl.
CPC ............... *H02K 5/24* (2013.01); *H02K 1/185* (2013.01)

(58) Field of Classification Search
CPC ............ H02K 1/18; H02K 1/185; H02K 5/24; H02K 7/16; H02K 2205/00
(Continued)

(56) References Cited

U.S. PATENT DOCUMENTS

| 4,318,068 A | 3/1982 | Hori |
| 5,132,584 A * | 7/1992 | Sasamoto ............ H02K 11/046 |
| | | 310/68 D |

(Continued)

FOREIGN PATENT DOCUMENTS

| JP | 56-002615 A | 1/1981 |
| JP | 57-060817 A | 4/1982 |

(Continued)

OTHER PUBLICATIONS

International Search Report (PCT/ISA/210) dated Mar. 22, 2016, by the Japan Patent Office as the International Searching Authority for International Application No. PCT/JP2016/050062.

(Continued)

*Primary Examiner* — Alex Torres-Rivera
*Assistant Examiner* — David A. Singh
(74) *Attorney, Agent, or Firm* — Buchanan Ingersoll & Rooney PC (57) ABSTRACT

A dynamic vibration absorber needs to be designed so that the natural frequency of the dynamic vibration absorber alone becomes equal to the natural frequency of a stator. If these natural frequencies greatly deviate from each other, the effect is reduced. Therefore, the natural frequency of the dynamic vibration absorber alone needs to be accurately calculated to make designing. However, in actual, the natural frequency is greatly influenced by the rigidity around the mounting position of a vibration damping target, and thus there is a problem that the natural frequency becomes different from the designed value upon mounting. An object of the present invention is to reduce an influence on the natural frequency of the dynamic vibration absorber alone given by the rigidity around the mounting position, by mounting a plurality of dynamic vibration absorbers to a (Continued)

dynamic vibration absorber mounting member, thereby making the dynamic vibration absorber more effective.

9 Claims, 8 Drawing Sheets

(58) Field of Classification Search
USPC .......................................... 310/51, 423, 431
See application file for complete search history.

(56) References Cited

U.S. PATENT DOCUMENTS

| | | | |
|---|---|---|---|
| 2007/0194666 A1 | 8/2007 | Hirakawa et al. | |
| 2010/0295407 A1* | 11/2010 | Boardman, IV | H02K 1/185 310/216.113 |
| 2010/0295408 A1* | 11/2010 | Boardman, IV | H02K 1/185 310/216.113 |
| 2011/0210643 A1 | 9/2011 | Tanavde et al. | |
| 2011/0266895 A1 | 11/2011 | Ichimonji et al. | |
| 2016/0053807 A1* | 2/2016 | Maciver | F16C 35/02 384/472 |

FOREIGN PATENT DOCUMENTS

| | | |
|---|---|---|
| JP | 2007-210386 A | 8/2007 |
| JP | 2010-124591 A | 6/2010 |
| JP | 2011-182636 A | 9/2011 |
| JP | 2011-234591 A | 11/2011 |
| JP | 2013-061058 A | 4/2013 |
| JP | 2014-096951 A | 5/2014 |

OTHER PUBLICATIONS

Written Opinion (PCT/ISA/237) dated Mar. 22, 2016, by the Japan Patent Office as the International Searching Authority for International Application No. PCT/JP2016/050062.

Office Action dated Jun. 28, 2019 in corresponding Chinese Patent Application No. 201680069879.2, 11 pages including 5 pages of English translation.

Extended European Search Report dated Nov. 22, 2018, issued by the European Patent Office in corresponding European Application No. 16883564.3. (8 pages).

* cited by examiner

ROTATING ELECTRIC MACHINE HAVING DYNAMIC VIBRATION ABSORBER

TECHNICAL FIELD

The present invention relates to a rotating electric machine having a dynamic vibration absorber provided for reducing vibration due to rotational movement of a rotor.

BACKGROUND ART

A rotating electric machine includes: a rotor having a rotary shaft; a stator provided so as to surround the outer circumference of the rotor; a housing formed so as to cover the stator; and a stator support member provided between the stator and the housing in order to support the stator. An electromagnetic excitation force occurring due to the rotational movement of the rotor acts on the rotor and the stator. The stator vibrates mainly due to the electromagnetic excitation force. At this time, the stator vibrates in a characteristic shape called mode of vibration. Focusing on vibration in the radial direction of the stator, in each mode of vibration, a point at which the amplitude in the radial direction is maximized is called antinode, and a point at which the amplitude in the radial direction is zero is called node. Along with occurrence of a rotating magnetic field, the electromagnetic excitation force also rotates. Therefore, at the positions where the stator support members are mounted on the stator, an antinode and a node of radial-direction vibration of the stator occur alternately. This vibration of the stator is transferred to the housing via the stator support members, thus causing a problem that vibration and noise occur from the housing. In view of such a problem, the following technique is proposed: a dynamic vibration absorber is mounted to a stator and a force of the dynamic vibration absorber is applied to the stator, thereby suppressing vibration of the stator (see Patent Documents 1, 2).

CITATION LIST

Patent Document

Patent Document 1: Japanese Laid-Open Patent Publication No. 2011-234591
Patent Document 2: Japanese Laid-Open Patent Publication No. 2014-96951

SUMMARY OF THE INVENTION

Problems to be Solved by the Invention

The dynamic vibration absorber needs to be designed so that the natural frequency of the dynamic vibration absorber alone becomes equal to or substantially equal to the natural frequency of a vibration damping target (e.g., stator core). If the natural frequency of the dynamic vibration absorber alone greatly deviates from the natural frequency of the vibration damping target, the effect thereof is reduced. Therefore, it is necessary to accurately calculate the natural frequency of the dynamic vibration absorber alone to make designing thereof.

However, in actual, the natural frequency is greatly influenced by the rigidity around the mounting position of the vibration damping target, and thus there is a problem that the natural frequency becomes a value different from the designed value upon mounting.

The present invention has been made to solve the above problem, and an object of the present invention is to reduce an influence on the natural frequency of the dynamic vibration absorber alone given by the rigidity around the mounting position, thereby making the dynamic vibration absorber more effective.

Solution to the Problems

A rotating electric machine according to the present invention includes: a rotor which rotates around an axis together with a rotary shaft; a stator provided so as to surround an outer circumference of the rotor; a dynamic vibration absorber suppressing vibration of the stator; and a mounting member with which the dynamic vibration absorber is mounted to the stator, wherein the mounting member has both ends engaged with two support rings surrounding a circumference of the stator, and is made from a material stretchable in an axial direction, and the dynamic vibration absorber is mounted near each of both ends of the mounting member.

Effect of the Invention

In the rotating electric machine of the present invention, since a dynamic vibration absorber is mounted near each of both ends of the mounting member, an influence on the natural frequency of the dynamic vibration absorbers given by the rigidity at the mounting position of the dynamic vibration absorber can be reduced.

DESCRIPTION OF EMBODIMENTS

Embodiment 1

Figure 1:
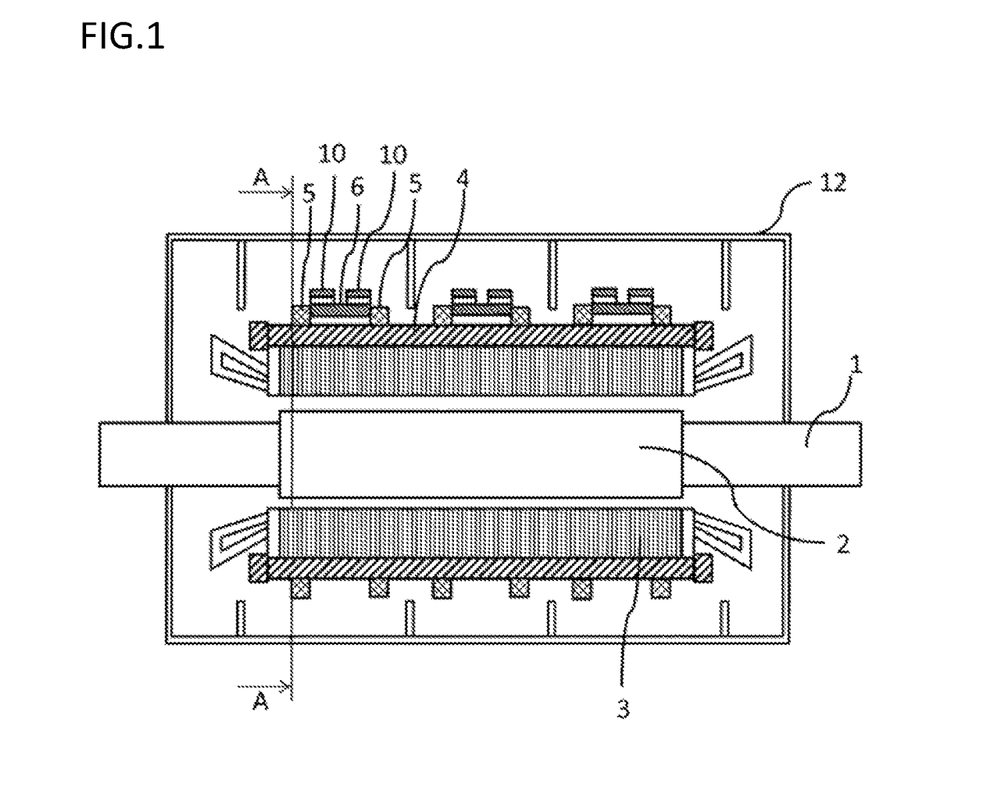
FIG. 1 is a schematic vertical sectional view of a rotating electric machine according to embodiment 1 of the present invention.
Figure 2:
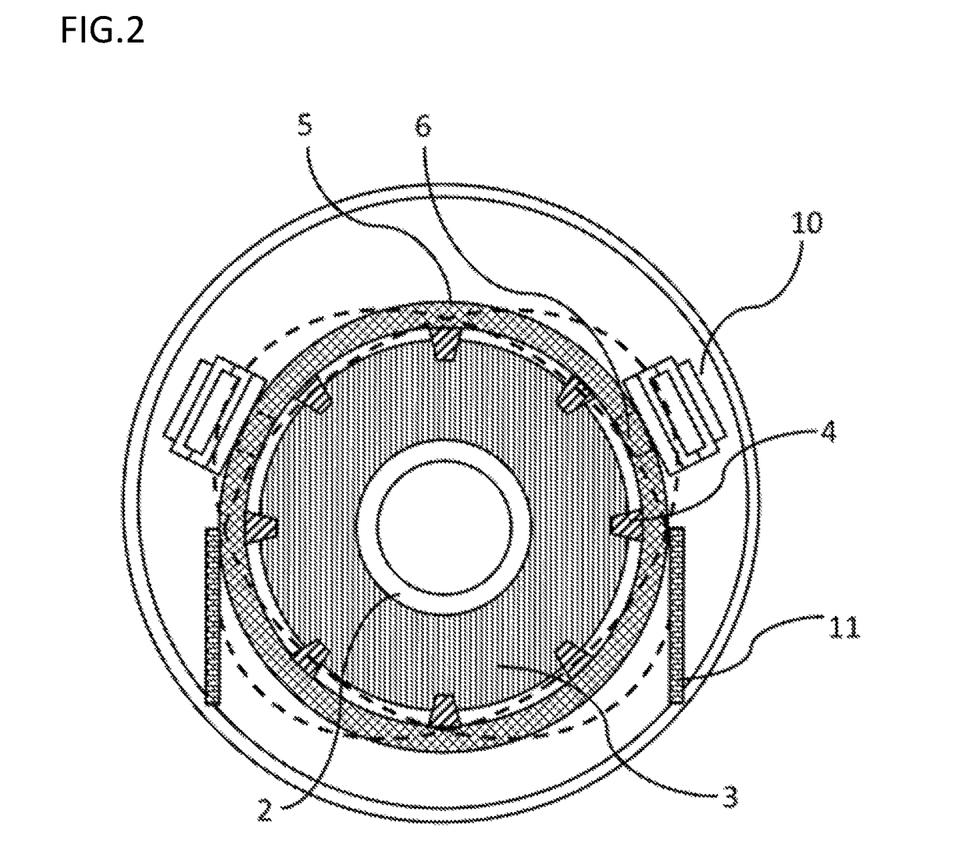
FIG. 2 is a schematic sectional view as seen from A-A arrow direction in FIG. 1.
Figure 3:
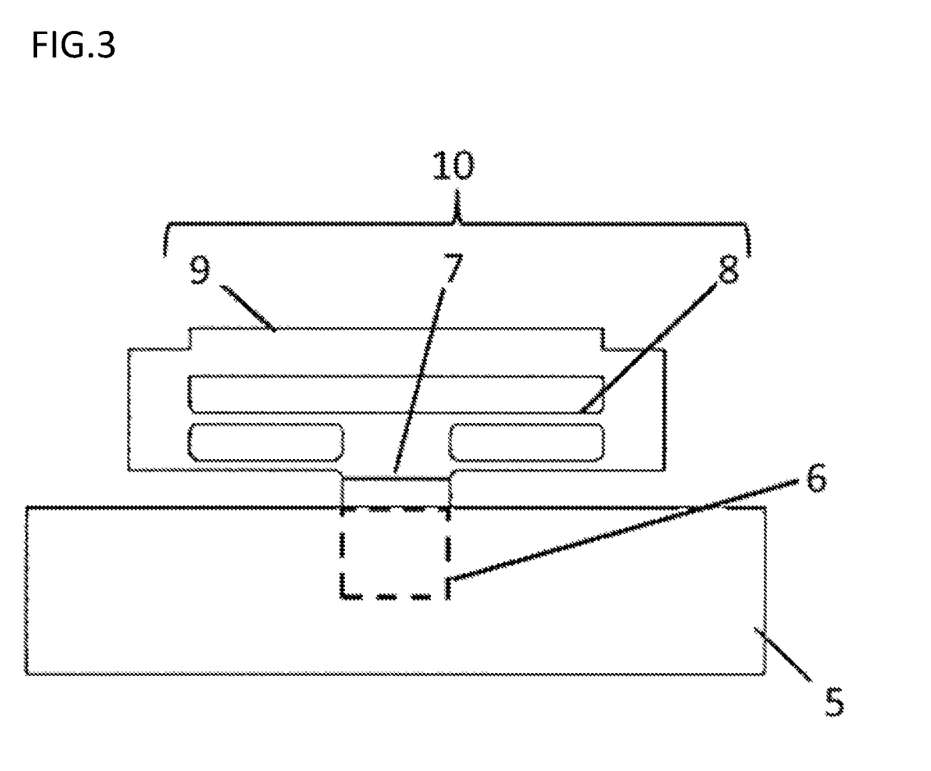
FIG. 3 is a front view of a dynamic vibration absorber according to embodiment 1 of the present invention.
Figure 4:
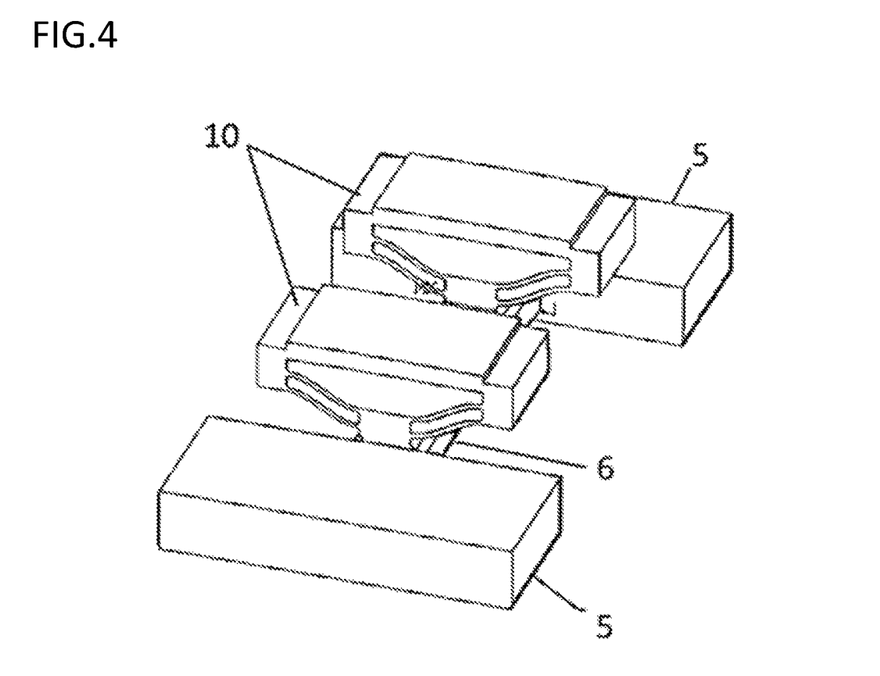
FIG. 4 is an enlarged perspective view of a part where the dynamic vibration absorber is mounted, according to embodiment 1 of the present invention.

FIG. 1 is a schematic vertical sectional view of a rotating electric machine, showing embodiment 1 of the present invention. FIG. 2 is a schematic sectional view as seen from A-A arrow direction in FIG. 1. FIG. 3 is a front view of a dynamic vibration absorber. FIG. 4 is an enlarged perspective view of a part where the dynamic vibration absorber is mounted. In the drawings, a rotary shaft 1 rotates around the axis, and a rotor 2 rotates together with the rotary shaft 1. A stator core 3 is formed from a plurality of iron sheets stacked in the axial direction, and is tightened in the axial direction by a plurality of core bolts 4 and in the circumferential direction by a plurality of support rings 5. After the tightening, the support rings 5 and the core bolts 4 are welded. Two support rings 5 form one set, and a dynamic vibration absorber mounting seat 6 is provided between two support rings 5, for example. Dynamic vibration absorbers 10 are mounted at both ends in the axial direction of the dynamic vibration absorber mounting seat 6. Each dynamic vibration absorber 10 is composed of a pedestal 7, an elastic portion 8, and a mass portion 9. A plate spring 11 is provided between the outer circumferential surface of the support ring 5 and a housing 12 so as to support a contact portion in the tangent direction of the support ring 5.

Next, operation will be described. In the case where the stator core 3 has such a natural mode of vibration (broken line in the drawing) as to repeat elliptic deformation, each dynamic vibration absorber 10 is mounted to an antinode part of the natural mode of vibration with the natural frequency of the dynamic vibration absorber 10 matched with the natural frequency of the stator core 3. Thus, the dynamic vibration absorber 10 vibrates at the vibration damping frequency and thereby can suppress vibration of the stator core 3. However, if one dynamic vibration absorber 10 is mounted at the center in the axial direction of the dynamic vibration absorber mounting seat 6, the flexural rigidity of the dynamic vibration absorber mounting seat 6 influences the natural frequency of the dynamic vibration absorber 10 alone. According to a result of analysis, it is found that the natural frequency of a system in which the dynamic vibration absorber mounting seat is taken into consideration is reduced by about 17% as compared to the natural frequency of the dynamic vibration absorber alone. However, as shown in FIG. 2 and FIG. 4, the dynamic vibration absorbers 10 are mounted at both ends in the axial direction of the dynamic vibration absorber mounting seat 6, whereby the influence of the flexural rigidity of the dynamic vibration absorber mounting seat can be reduced enough to be ignored.

Embodiment 2

Figure 5:
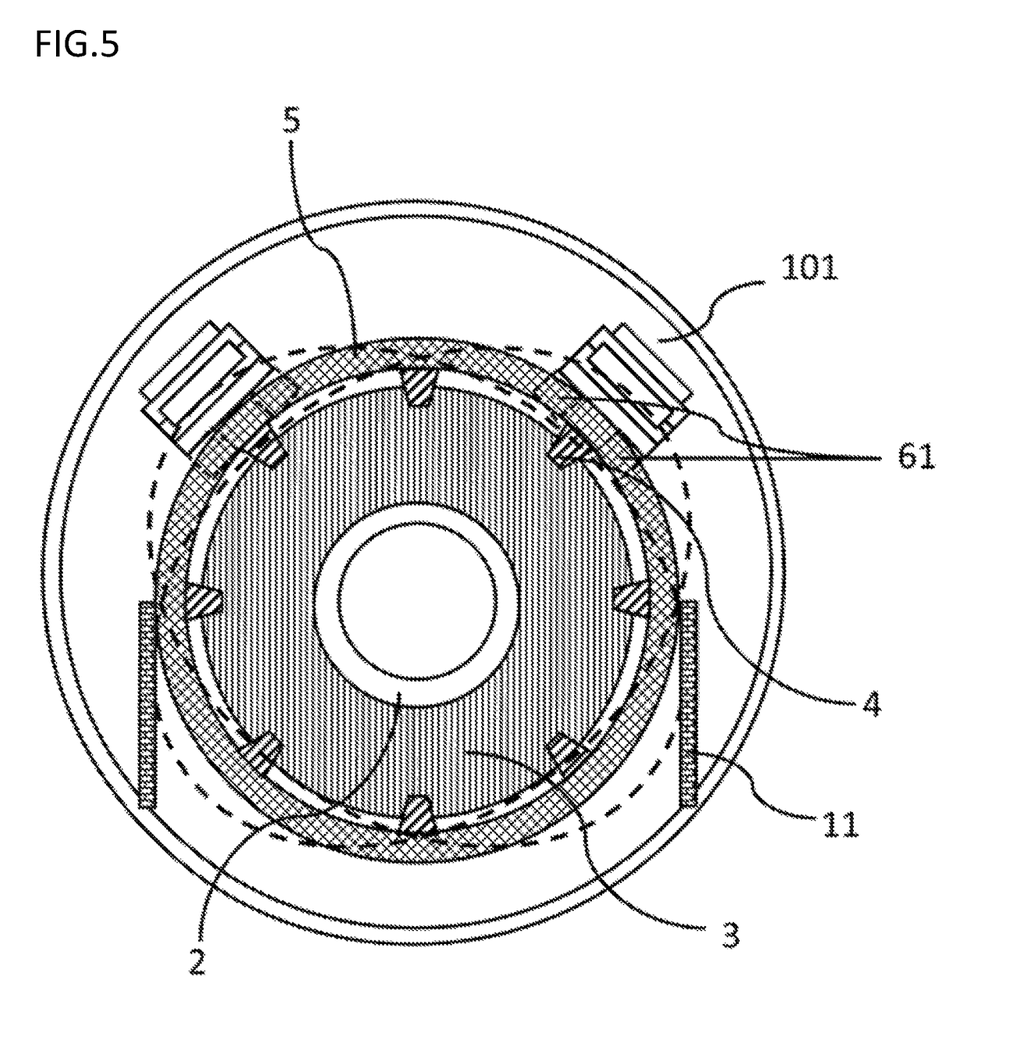
FIG. 5 is a schematic horizontal sectional view of a rotating electric machine according to embodiment 2 of the present invention.
Figure 6:
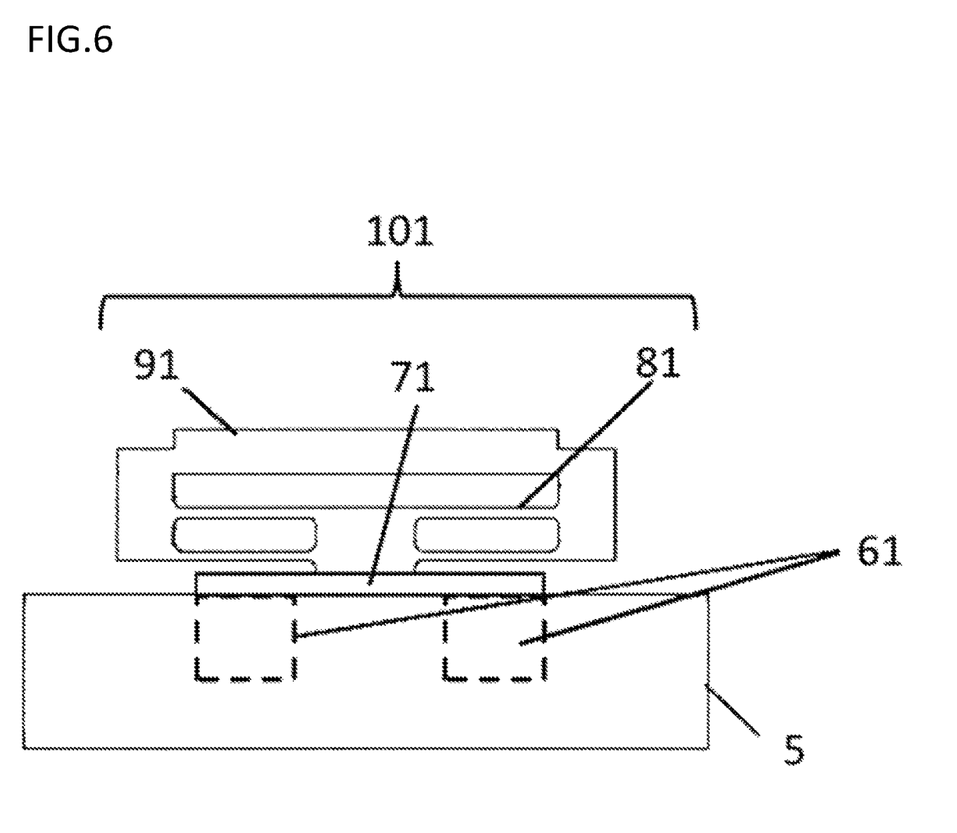
FIG. 6 is a front view of a dynamic vibration absorber according to embodiment 2 of the present invention.

In embodiment 1, reduction in the influence of the rigidity of the dynamic vibration absorber mounting seat 6 has been described. However, while the dynamic vibration absorbers 10 are mounted to the dynamic vibration absorber mounting seat 6, the dynamic vibration absorber mounting seat 6 is mounted to the support ring 5. That is, the natural frequency of the dynamic vibration absorber 10 alone is influenced by not only the dynamic vibration absorber mounting seat 6 but also the rigidity of the support ring 5. As described above, the support rings 5 are welded to the core bolts 4. Therefore, the flexural rigidity of each support ring 5 is minimized at a part between the core bolts 4 in the circumferential direction of the support ring 5. Accordingly, the influence of the flexural rigidity of the support ring 5 on the natural frequency of the dynamic vibration absorber 10 alone becomes great. In order to solve this, as shown in FIG. 5 and FIG. 6, dynamic vibration absorber mounting seats 61 are mounted to both sides of the core bolt 4 so as to stride over the core bolt 4. A dynamic vibration absorber 101 is composed of a pedestal 71, an elastic portion 81, and a mass portion 91. Mounting the dynamic vibration absorber 101 as described above can further reduce the influence on the natural frequency of the dynamic vibration absorber 101 as compared to embodiment 1.

Embodiment 3

Figure 7:
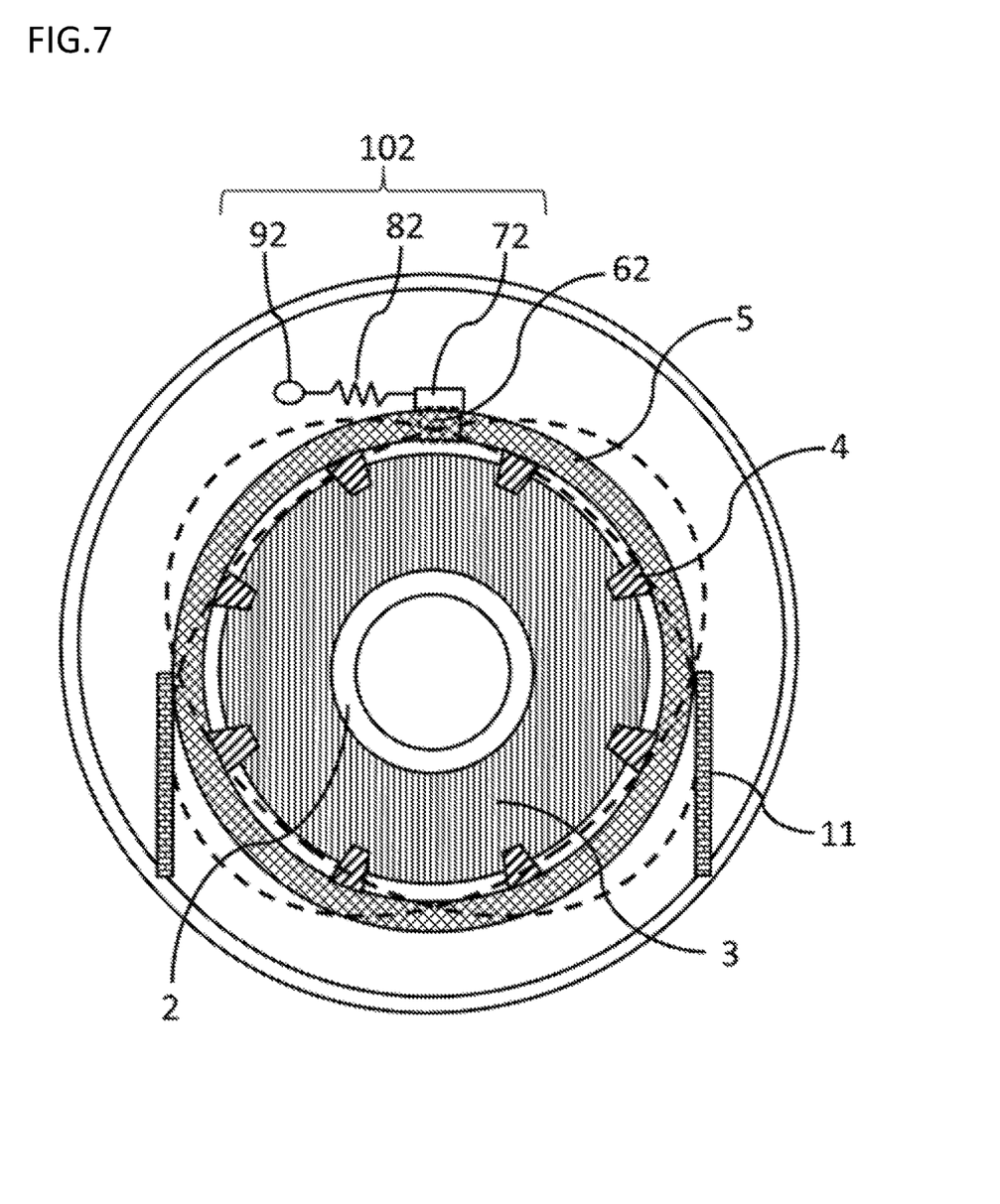
FIG. 7 is a schematic horizontal sectional view of a rotating electric machine provided with a dynamic vibration absorber according to embodiment 3 of the present invention.
Figure 8:
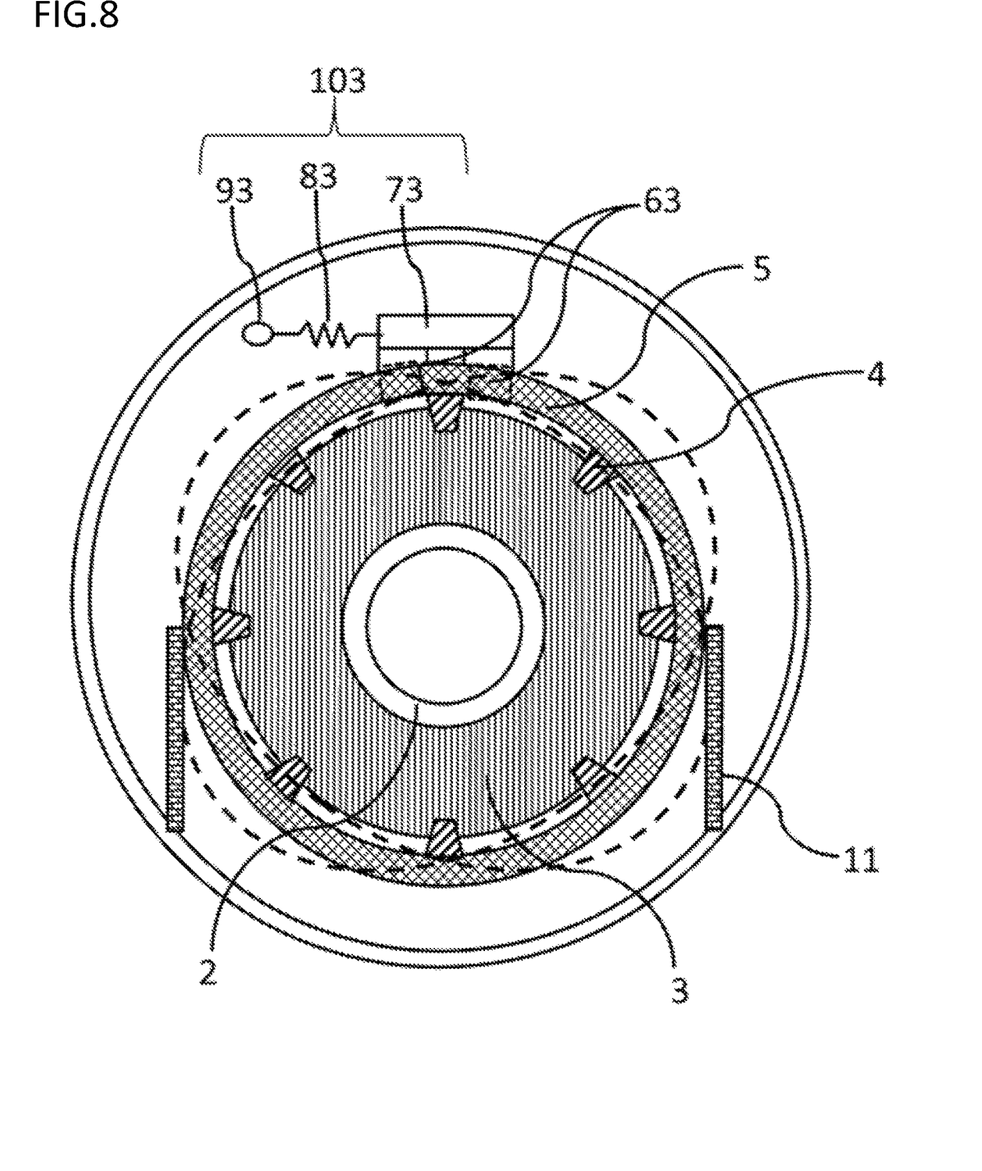
FIG. 8 is a schematic horizontal sectional view of a rotating electric machine provided with another dynamic vibration absorber according to embodiment 3 of the present invention.

In embodiments 1 and 2, the dynamic vibration absorbers 10, 101 are mounted at antinode parts of the mode of vibration of the stator core 3, so that the elastic portions 8, 81 of the dynamic vibration absorbers 10, 101 vibrate in the radial direction of the stator core 3. However, as shown in mounting conceptual diagrams in FIG. 7 and FIG. 8, dynamic vibration absorbers 102, 103 may be mounted at node parts of the mode of vibration of the stator core 3 so that elastic portions 82, 83 vibrate in the circumferential direction. One end of each elastic portion 82, 83 is supported by a pedestal 72, 73, and a mass portion 92, 93 is formed at the other end.

It is noted that, within the scope of the present invention, the above embodiments may be freely combined with each other, or each of the above embodiments may be modified or simplified as appropriate.

DESCRIPTION OF THE REFERENCE CHARACTERS

1 rotary shaft
2 rotor
3 stator core
4 core bolt
5 support ring
6, 61, 62, 63 dynamic vibration absorber mounting seat
7, 71, 72, 73 pedestal
8, 81, 82, 83 elastic portion
9, 91, 92, 93 mass portion
10, 101, 102, 103 dynamic vibration absorber
11 plate spring

The invention claimed is:
1. A rotating electric machine comprising:
a rotor which rotates around an axis together with a rotary shaft;
a stator provided so as to surround an outer circumference of the rotor;
first and second dynamic vibration absorbers suppressing vibration of the stator; and
a single mounting member with which the first and second dynamic vibration absorbers are mounted to the stator, wherein
the single mounting member has both ends engaged with two support rings surrounding a circumference of the stator, and is made from a material stretchable in an axial direction, and
the first and second dynamic vibration absorbers are respectively mounted near each of both ends of the single mounting member.
2. The rotating electric machine according to claim 1, wherein
the single mounting member is provided so as to stride over a core bolt tightening the stator in the axial direction.
3. The rotating electric machine according to claim 2, wherein
each of the first and second dynamic vibration absorbers includes an elastic portion and a mass portion and is mounted to the single mounting member so that the elastic portion vibrates in a radial direction of the stator.

4. The rotating electric machine according to claim 2, wherein
each of the first and second dynamic vibration absorbers includes a mass portion and an elastic portion and is mounted to the single mounting member so that the elastic portion vibrates in a circumferential direction of the stator.

5. The rotating electric machine according to claim 2, wherein
each of the first and second dynamic vibration absorbers includes a pedestal mounted to the single mounting member and a mass portion and an elastic portion mounted to the pedestal.

6. The rotating electric machine according to claim 1, wherein
each of the first and second dynamic vibration absorbers includes an elastic portion and a mass portion and is mounted to the single mounting member so that the elastic portion vibrates in a radial direction of the stator.

7. The rotating electric machine according to claim 1, wherein
each of the first and second dynamic vibration absorbers includes a mass portion and an elastic portion and is mounted to the single mounting member so that the elastic portion vibrates in a circumferential direction of the stator.

8. The rotating electric machine according to claim 1, wherein
each of the first and second dynamic vibration absorbers includes a pedestal mounted to the single mounting member and a mass portion and an elastic portion mounted to the pedestal.

9. A rotating electric machine comprising:
a rotor which rotates around an axis together with a rotary shaft;
a stator provided so as to surround an outer circumference of the rotor;
a pair of dynamic vibration absorbers suppressing vibration of the stator and arranged along an axial direction parallel to a rotation axis of the rotary shaft; and
a mounting member with which the pair of dynamic vibration absorbers is mounted to the stator, wherein
the mounting member has both ends engaged with two support rings surrounding a circumference of the stator, and is made from a material stretchable in an axial direction, and
each dynamic vibration absorber of the pair of dynamic vibration absorbers includes a pedestal mounted to the mounting member and a mass portion and an elastic portion mounted to the pedestal.

* * * * *